United States Patent
Styles et al.

(10) Patent No.: US 9,605,906 B2
(45) Date of Patent: Mar. 28, 2017

(54) AUTOMOTIVE HEAT RECOVERY SYSTEM

(75) Inventors: Bryan Styles, South Lyon, MI (US); Kwangtaek Hong, Ann Arbor, MI (US); Bradley Brodie, Milford, MI (US)

(73) Assignee: Denso International America Inc., Southfield, MI (US)

( * ) Notice: Subject to any disclaimer, the term of this patent is extended or adjusted under 35 U.S.C. 154(b) by 1121 days.

(21) Appl. No.: 13/316,688

(22) Filed: Dec. 12, 2011

(65) Prior Publication Data
US 2012/0152487 A1 Jun. 21, 2012

Related U.S. Application Data

(60) Provisional application No. 61/423,761, filed on Dec. 16, 2010.

(51) Int. Cl.
*F23L 15/02* (2006.01)
*F28D 17/00* (2006.01)
*F28D 15/00* (2006.01)
*F01N 5/02* (2006.01)
*F28D 20/02* (2006.01)
*F28D 21/00* (2006.01)

(52) U.S. Cl.
CPC ............... *F28D 15/00* (2013.01); *F01N 5/02* (2013.01); *F28D 20/028* (2013.01); *F01N 2240/02* (2013.01); *F28D 21/0003* (2013.01); *F28D 2021/008* (2013.01); *Y02E 60/145* (2013.01); *Y02T 10/16* (2013.01)

(58) Field of Classification Search
CPC ........ F28D 15/00; F28D 20/028; F28D 20/02; F28D 20/0056; F28D 20/023; F28D 15/043; F28D 21/0003; F28D 2021/008; Y02E 60/142; Y02E 60/145; F01N 5/02; F01N 2240/02
USPC ..................... 165/4, 10, 41; 60/320
See application file for complete search history.

(56) References Cited

U.S. PATENT DOCUMENTS

| 2009/0211726 A1 | 8/2009 | Bank et al. |
| 2009/0250189 A1 | 10/2009 | Soukhojak et al. |
| 2011/0162829 A1* | 7/2011 | Xiang .......................... 165/234 |
| 2012/0168111 A1* | 7/2012 | Soukhojak et al. ............ 165/10 |

FOREIGN PATENT DOCUMENTS

JP    2010-107093    5/2010

* cited by examiner

*Primary Examiner* — Jianying Atkisson
*Assistant Examiner* — Jon T Schermerhorn
(74) *Attorney, Agent, or Firm* — Harness, Dickey & Pierce, P.L.C.

(57) ABSTRACT

A heat recovery system captures, stores, and releases waste heat from an exhaust. The system includes a first exchanger that removes waste heat from the exhaust and transfers it to a heat transfer fluid. A second heat exchanger transfers at least a portion of the waste heat from the heat transfer fluid to a storage device. The storage device continuously stores the waste heat until a predetermined temperature is obtained. A pump draws flow of the heat transfer fluid from the first heat exchanger to the second heat exchanger. A valve directs flow of the heat transfer fluid into the storage device during a charge mode and out of the storage device during a discharge mode.

7 Claims, 4 Drawing Sheets

AUTOMOTIVE HEAT RECOVERY SYSTEM

CROSS-REFERENCE TO RELATED APPLICATIONS

This application claims the benefit of U.S. Provisional Application No. 61/423,761, filed on Dec. 16, 2010. The entire disclosure of the above application is incorporated herein by reference.

FIELD

The present disclosure relates to an automotive heat recovery system.

BACKGROUND

This section provides background information related to the present disclosure which is not necessarily prior art.

Automotive vehicles typically utilize internal combustion engines for providing controlled combustion of hydrocarbon fuels. The fuels, however, are often incompletely combusted, leaving exhaust by-products (e.g., hydrocarbons, NMOG, carbon monoxide) having very high temperatures and toxicity. Advances in engine and vehicle material technologies have aided in reducing the toxicity of exhaust leaving the engine. Further, conventional heat exchange apparatuses have provided a means of recovery for some of the exhaust heat. These advances, however, have generally proved insufficient to meet increasing emissions goals. For example, it is necessary to further improve vehicle fuel economy to meet changing regulations requiring increasing reductions of certain components of vehicle exhaust gas emissions.

SUMMARY

This section provides a general summary of the disclosure, and is not a comprehensive disclosure of its full scope or all of its features.

A heat recovery system captures, stores, and releases waste heat from an exhaust. The system may include a first exchanger that removes waste heat from exhaust gases and transfers it to a heat transfer fluid. A second heat exchanger may transfer at least a portion of the waste heat from the heat transfer fluid to a storage device. The storage device continuously stores the waste heat until a predetermined temperature is obtained. A pump draws flow of the heat transfer fluid from the first heat exchanger to the second heat exchanger. A valve directs flow of the heat transfer fluid into the storage device during a charge mode and out of the storage device during a discharge mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The preferred and other embodiments of an automotive heat recovery system 10 will now be described more fully with reference to FIGS. 1-6. The heat recovery system 10 captures, stores, and releases waste heat from a vehicle for improved efficiency. As such, the heat recovery system 10 operates in two alternate modes: 1) a charge mode for receiving and storing excess heat from the vehicle, and circulating to components or subsystems critical to emissions, and 2) a discharge mode for providing excess heat back to the vehicle, such as during or for a cold engine start.

Figure 1:
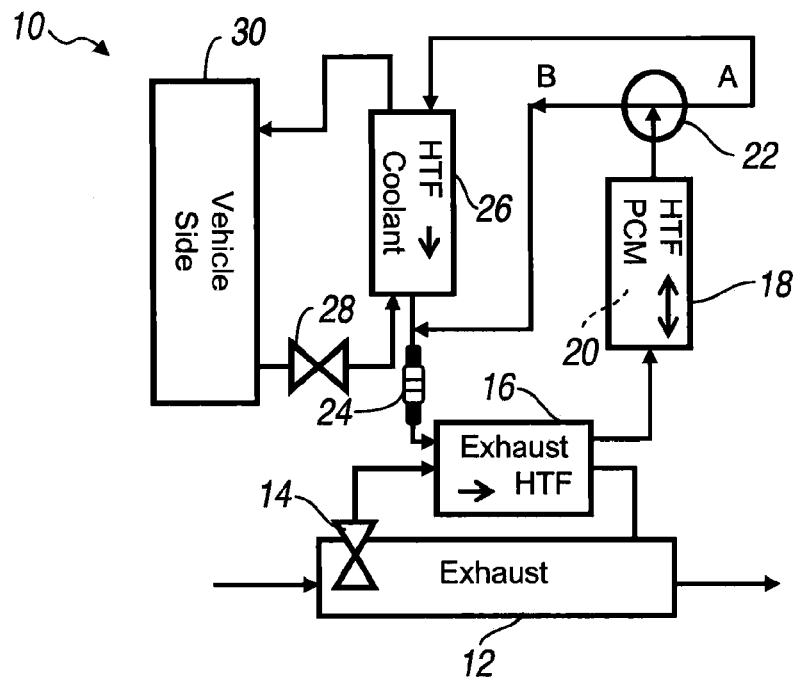
FIG. 1 is a schematic view of an exemplary automotive heat recovery system in a charging phase of a charge mode in accordance with the present disclosure.

Referring now to FIG. 1, the heat recovery system 10 is shown in communication with a vehicle exhaust system 12. The heat recovery system 10 includes an exhaust bypass valve 14, a first heat exchanger 16 for moving heat from the exhaust to a heat transfer fluid, a second heat exchanger 18 for moving heat from the heat transfer fluid to a phase changing material (PCM) 20, a heat exchanger bypass valve 22, and a compressor or pump 24. Additional components, such as a third heat exchanger 26 (e.g., for moving heat from the heat transfer fluid to the coolant system or other vehicle subsystem requiring heat energy) and a coolant shut-off valve 28, may also be included in the heat recovery system 10.

In charge mode, the first heat exchanger 16 transfers waste heat from the vehicle exhaust system 12 to a heat transfer fluid. The charge mode begins after the exhaust gas has warmed. The heat transfer fluid accepts the waste heat from the vehicle exhaust system 12 through utilization of the fluid's sensible or latent heat. The second heat exchanger 18 transfers the waste heat in the heat transfer fluid to at least one vehicle subsystem 30 including the optional third heat exchanger 26 or recirculates it to the pump 24. The second heat exchanger 18 may incorporate the PCM 20 that utilizes solid-to-solid, solid-to-liquid, or liquid-to-vapor phase changing to accept heat. The directionality of the heat exchanger bypass valve 22 determines the flow of the heat transfer fluid from the second heat exchanger 18. For example, the bypass valve 22 may be a three-way valve that can allow flow in one or more of direction A and direction B.

Figure 2:
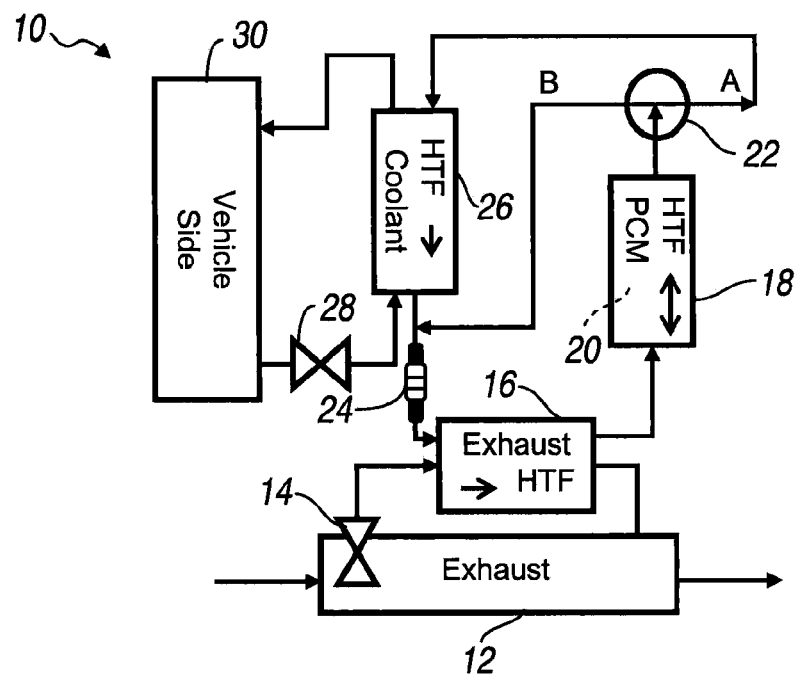
FIG. 2 is a schematic view of the exemplary heat recovery system of FIG. 1 in a charge-sustaining phase.
Figure 3:
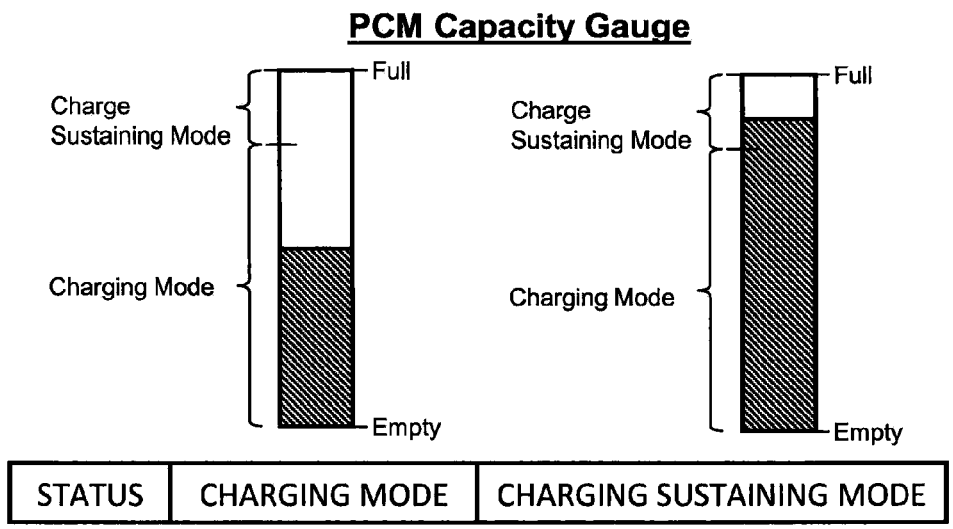
FIG. 3 is a graphical representation of a capacity gauge for a phase change material device having the charge and charge-sustaining phases.

Referring now to FIGS. 1 through 3, the charge mode can be split into a charging phase (FIG. 1) and a charge-sustaining phase (FIG. 2). The charging phase occurs when the PCM 20 of the second heat exchanger 18 is below a pre-determined capacity as depicted graphically in FIG. 3. In such a case, the heat recovery system 10 is controlled to primarily charge the PCM 20 and provide heating to components or subsystems critical to emissions. For example, the vehicle subsystem can include, but is not limited to, engine coolant, engine oil, transmission oil, or any fluid requiring thermal management within the vehicle. Heat, however, will not be taken from the PCM 20 to meet demands of comfort-driven technologies.

As shown in FIG. 1, during the charging phase and when the engine is fully warm, the exhaust bypass valve 14 is opened to allow exhaust gas to flow through the first heat exchanger 16. All valves that thermally connect the PCM 20 to other vehicle subsystems 30 (e.g., coolant shut-off valve 28) are closed to maximize charging rate of the PCM 20 in the second heat exchanger 18. Additional valving (e.g., heat exchanger bypass valve 22) may be included within the heat recovery system 10 to bypass supporting heat exchangers (e.g., third heat exchanger 26) that are contained in the heat recovery system 10. For example, the bypass valve 22 may be opened in the direction B while closing the direction A, for unidirectional flow of the heat transfer fluid. In this configuration, heat is transferred to the heat transfer fluid from the exhaust in the first heat exchanger 16. The heat transfer fluid then flows to the second heat exchanger 18 where the heat transfer fluid rejects its heat into the PCM 20 to charge the PCM 20. The heat transfer fluid is then directed back to the first heat exchanger 16 via the pump 24. The charging phase continues until the PCM 20 has reached a pre-determined capacity.

With reference to FIGS. 2 and 3, the charge-sustaining phase will now be described for the heat recovery system 10. The charge-sustaining phase is initiated when the pre-determined capacity for the PCM 20 is met or exceeded as shown graphically in FIG. 3. The capacity threshold may be determined based on a temperature reading of the PCM 20, for example. If temperature is used, the threshold temperature will be marginally higher than the phase change temperature of the PCM 20, but marginally lower than the maximum temperature of the PCM 20. For example, the temperature margin above the phase change temperature could be a fixed value, such as 5° C., 10° C., or 15° C. higher than the phase change temperature. Any temperature greater than the fixed value and less than the lower margin set for the maximum temperature of the PCM 20, would correspond to the charge-sustaining phase. The lower margin may be set similarly.

Figure 4:
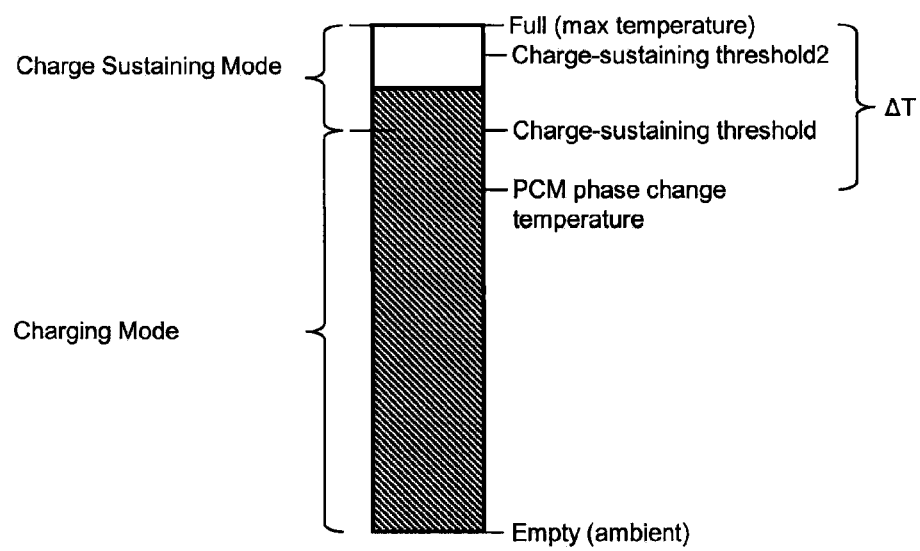
FIG. 4 is a graphical representation of the capacity gauge of FIG. 3 further fractioning the charge-sustaining phase.

Referring now to FIG. 4, an additional method for determining the threshold value of the charge-sustaining phase may include determining the temperature differential (i.e., $\Delta T$) between the phase change and maximum allowable temperatures of the PCM 20, as defined by the PCM 20 itself. As should be understood, alternate materials for the PCM 20 will have alternate values for $\Delta T$. The particular thresholds may then be determined by taking a fraction of the $\Delta T$ and adding it to the phase change temperature and/or subtracting it from the maximum allowable phase change temperature. Such a $\Delta T$ could be different for each threshold. For example, if the $\Delta T$ for a particular material is 30° C., a particular control strategy may select ⅕ $\Delta T$ for the margin above the phase change temperature. Accordingly, if the phase change temperature were 150° C., this would mean that the lower threshold for entering the charge-sustaining phase would be 156° C. Selecting an appropriate fraction of $\Delta T$ is critical to the maximization of stored energy in the PCM 20.

It should be understood that a similar methodology may be employed on the maximum temperature side to select a suitable fraction of $\Delta T$ as a margin. Suitable fractions for the selection of such a margin would range generally from approximately $\frac{1}{50}^{th}$ to approximately ½; however, larger or smaller fractions could be selected depending on the particular characteristics of the PCM 20.

Once the charge-sustaining phase is reached, the heat recovery system 10 can continue to charge the PCM 20, but heat can also be removed to provide for the demands of the subsystems 30. Such subsystems 30 may include, but are not limited to, seat heating, cabin heating, and cup warmers. The charge-sustaining phase provides waste heat to comfort-driven technologies without depleting the charge of the PCM 20. The heat recovery system 10 continues to accept heat from the vehicle exhaust system 12 until the PCM 20 capacity is full. PCM 20 charging may be cycled based on a predetermined hysteresis.

The capacity of the PCM 20 should be monitored such that the heat removed from the PCM 20 does not exceed the heat added to the PCM 20 from the vehicle exhaust system 12. Such a control strategy results in improved fuel economy, as these comfort-driven technologies typically derive their heat from an electrical source requiring additional fuel consumption to enable alternator generation.

Heat absorption should not far exceed the demands of the vehicle subsystems 30. Accordingly, there are many possible methods to implement control over the heat absorption rates, such as, monitoring the rate of temperature increase of the PCM 20. If the temperature is determined to be rising too quickly, then the exhaust bypass valve 14 could be urged slightly shut to reduce the amount of heat entering the PCM 20. Furthermore, if the heat demand exceeds the rate of heat pickup (i.e., temperature of the PCM 20 decreasing) then the exhaust bypass valve 14 could be opened to a greater degree. If there are no supplementary heating requirements, the exhaust bypass valve 14 could be completely shut to prevent overheating of the PCM 20. In such a case, the pump 24 would be turned off to prevent heat removal from the PCM 20.

With reference again to FIGS. 1 and 2, the discharge mode is engaged when the coolant temperature is below a specified value. Typically, this mode will only be engaged after the vehicle has been turned off for an extended time and thus has been cooled. Once the vehicle ignition is turned on, or a triggering event is activated (e.g., door unlocked remotely, door opening), all valves related to the heating of emissions-critical components can be opened (e.g., valves 14, 22, 28). At this point, the pump 24 will be turned on and the heat transfer fluid will begin to transfer heat to the emissions-critical fluids/components.

Once the vehicle begins operating, the heat from the vehicle exhaust system 12 can be transferred to the heat transfer fluid via the first heat exchanger 16. During this stage, the majority of heat is transferred to the emissions-critical fluids/components as quickly as possible to reduce the impact of a cold start on vehicle emissions. The discharge mode continues until the emissions-critical fluids/components reach a predetermined temperature threshold. At this predetermined temperature threshold, the heat recovery system 10 will switch from the discharge mode to the charge mode described above.

Broadly, in charge mode, the exhaust bypass valve 14 is set to open, the coolant shut-off valve 28 is set to close, and the heat exchanger bypass valve 22 is set in the direction B. The pump 24 is turned on and the cycle begins. Once the charge of the PCM 20 is complete, the exhaust bypass valve 14 is closed and the pump 24 is turned off. In discharge mode, the exhaust bypass valve 14 and the coolant shut-off valve 28 are set to open, while the heat exchanger bypass valve 22 is set in the direction A. The pump 24 is turned on until the coolant temperature equals (or is greater than) a predetermined temperature target. The heat recovery system 10 is then switched to charge mode.

Figure 5:
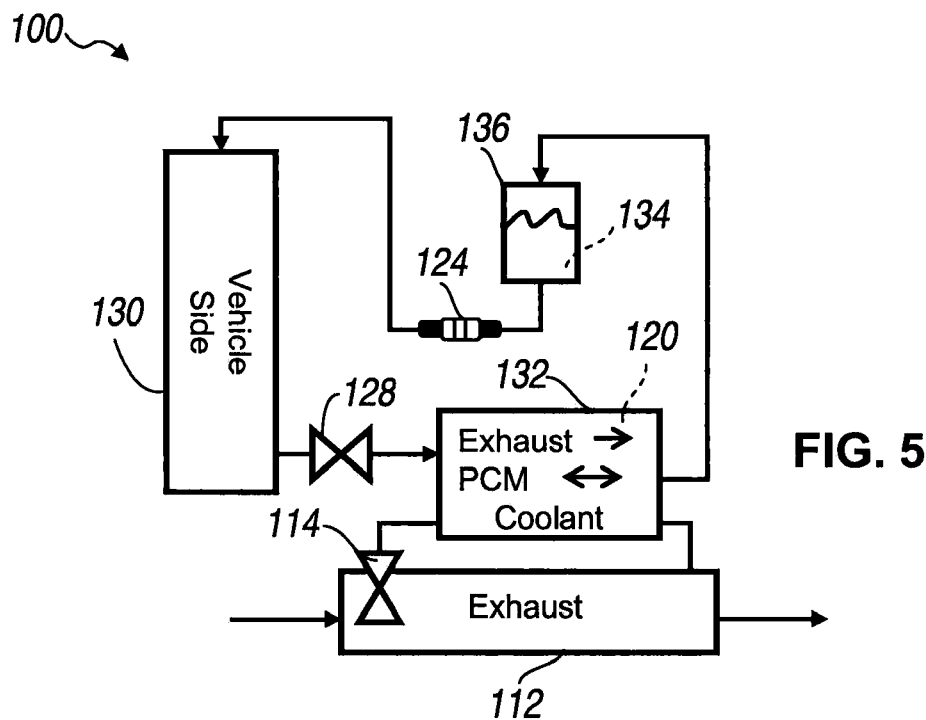
FIG. 5 is a schematic view of a second exemplary heat recovery system.

Referring now to FIG. 5, a second embodiment of an automotive heat recovery system is shown as reference number 100. The heat recovery system 100 has a similar control structure as the heat recovery system 10 when determining which mode to use for operation; however, different detailed control is employed when actually operating in each particular mode. Nonetheless, the heat recovery system 100 includes similar components as the heat recovery system 10, and as such, like reference numbers are used to describe like components. In particular, the heat recovery system 100 includes a vehicle exhaust system 112, an exhaust bypass valve 114, a PCM 120, a pump 124, a coolant shut-off valve 128, and at least one vehicle subsystem 130.

When the heat recovery system 100 is operating in the charge mode, the exhaust bypass valve 114 is opened to allow exhaust to enter a primary heat exchanger 132. All other system valving (e.g., coolant shut-off valve 128) for thermally coupling the primary heat exchanger 132 to any other vehicle subsystem 130 would be closed. The pump 124 assists in the circulation of a coolant 134 from the primary heat exchanger 132 to a coolant separation device (e.g., a de-aeration bottle 136) until all coolant 134 has been removed from the primary heat exchanger 132. Once all coolant 134 has been removed from the primary heat exchanger 132, the pump 124 is shut down. Removal of the coolant 134 assists in avoidance of denaturization of the coolant 134.

The de-aeration bottle 136 stores all coolant 134, as is known to those in the art. For example, the de-aeration bottle 136 may continuously accumulate and separate air from the coolant 134. By way of this separation, air may migrate to the vehicle's heater for warming the vehicle's passenger compartment.

An alternative way to remove the coolant 134 from the primary heat exchanger 132 would be to deflate a diaphragm (not shown) connected to an upper portion of the de-aeration bottle 136 such that the bottle 136 would be at a negative pressure in relation to the primary heat exchanger 132. The coolant 134 could then be drawn into the de-aeration bottle 136 for separation. While the diaphragm is discussed for creating negative pressure, it should be understood that any other means may be connected to the de-aeration bottle 136 for generating a vacuum to draw in coolant 134 from the primary heat exchanger 132. For example, a device could be connected to the air inlet of the engine to pull a slight vacuum. Additionally, the heat recovery system 100 could rely on the heating of the primary heat exchanger 132 by the vehicle exhaust system 112 to push hot coolant 134 from the primary heat exchanger 132 to the de-aeration bottle 136.

Broadly, in charge mode, the exhaust bypass valve 114 is set to open and the coolant shut-off valve 128 is set to close. The pump 124 is turned off and the cycle begins. Once the charge of the PCM 120 is complete, the exhaust bypass valve 114 and the coolant shut-off valve 128 are closed. The pump 124 is turned on until coolant 134 is removed from the primary heat exchanger 132. The pump 124 is then turned off. In discharge mode (e.g., during a cold start), the exhaust bypass valve 114 and the coolant shut-off valve 128 are set to open. The pump 124 is turned on until the coolant temperature equals (or is greater than) a predetermined temperature target. The heat recovery system 100 is then switched to charge mode.

Figure 6:
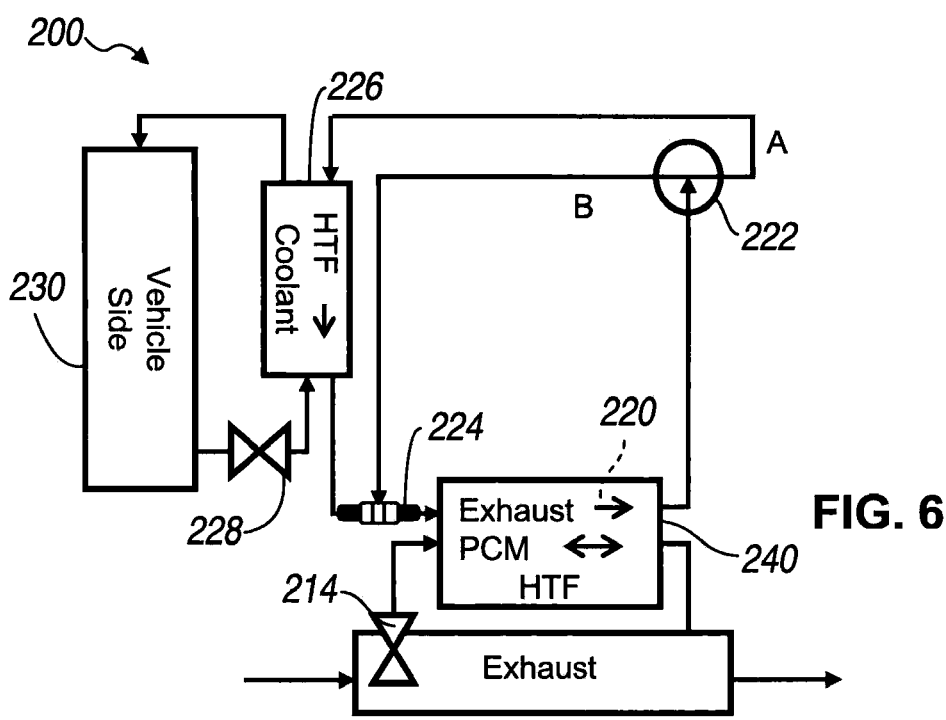
FIG. 6 is a schematic view of a third exemplary heat recovery system.

Referring now to FIG. 6, a third embodiment of an automotive heat recovery system is shown as reference number 200. The heat recovery system 200 has a similar modal structure as the heat recovery system 10; however, there is no inclusion of any additional vehicle subsystems 30. Therefore, operation of the charge-sustaining mode would be unnecessary unless additional heat is required for additional heating capacity. Nonetheless, the heat recovery system 200 includes similar components as the heat recovery system 10, and as such, like reference numbers are used to describe like components. In particular, the heat recovery system 200 includes an exhaust bypass valve 214, a PCM 220, a heat exchanger bypass valve 222, a pump 224, a heat exchanger 226, a coolant shut-off valve 228, and at least one vehicle subsystem 230.

The heat recovery system 200 charges similarly to the heat recovery system 10, until it reaches a predetermined point wherein the heat recovery system 200 is adjudged to be fully charged. Once the charge temperature has been reached, the exhaust bypass valve 214 is shut for the remainder of vehicle operation. While this single-event scenario eases controllability of engine management, it does not reap the benefit of further waste heat utilization. Therefore, the overall efficiency and waste-heat utilization is potentially lower than that of the heat recovery system 10 (depending on the duration of continuous vehicle operation).

The discharge mode of heat recovery system 200 is also very similar to that of the heat recovery system 10. Notably, however, the heat recovery system 200 integrates the heat exchanger 16 for moving heat from the vehicle exhaust system 12 to the heat transfer fluid and the heat exchanger 18 for moving heat from the heat transfer fluid to the PCM 20 into one device—an exhaust-to-PCM-to-heat transfer fluid heat exchanger 240. This heat exchanger 240 may be thermally interfaced with any number of vehicle subsystems 230 through secondary heat exchangers (e.g., heat exchanger 226) that thermally couple the heat transfer fluid to the subsystems 230 that require supplemental heating.

The heat recovery system 200 provides continued utilization of exhaust waste heat even after full charging of the PCM 220. This additional heat can be used to provide supplemental heat energy to the vehicle subsystems 230 previously discussed. This heat recovery system 200 also eliminates the need for a coolant separation device (e.g., de-aeration bottle 136) since the fluid itself never needs to be fully evacuated from the PCM 220. As such, the sensible heat of the heat transfer fluid along with additional storage capacity in the PCM 220 can be utilized. Accordingly, the size of the PCM 220 for attaining a specified storage target may be reduced in the heat recovery system 200.

As can be seen, the PCM 220 is in direct thermal contact with the exhaust stream. Therefore, power is not needed for pumping the heat to an additional heat exchanger containing the PCM 220. As the heat recovery system 200 includes fewer heat exchangers than required by the heat recovery system 10, advantageous impacts on weight and cost are realized while still operating in nearly the same manner with the same benefits. It should be noted, however, that during discharge the pump 224 may still be operated to provide heat to the heat recovery system 200.

Broadly, in charge mode, the exhaust bypass valve 214 is set to open, the coolant shut-off valve 228 is set to close, and the heat exchanger bypass valve 222 is set in the direction B. The pump 224 is turned on and the cycle begins. Once the charge of the PCM 220 is complete, the exhaust bypass valve 214 is closed and the pump 224 is turned off. In discharge mode, the exhaust bypass valve 214 and the coolant shut-off valve 228 are set to open, while the heat exchanger bypass valve 222 is set in the direction A. The pump 224 is turned on until the coolant temperature equals (or is greater than) a predetermined temperature target. The heat recovery system 200 is then switched to charge mode.

Figure 7:
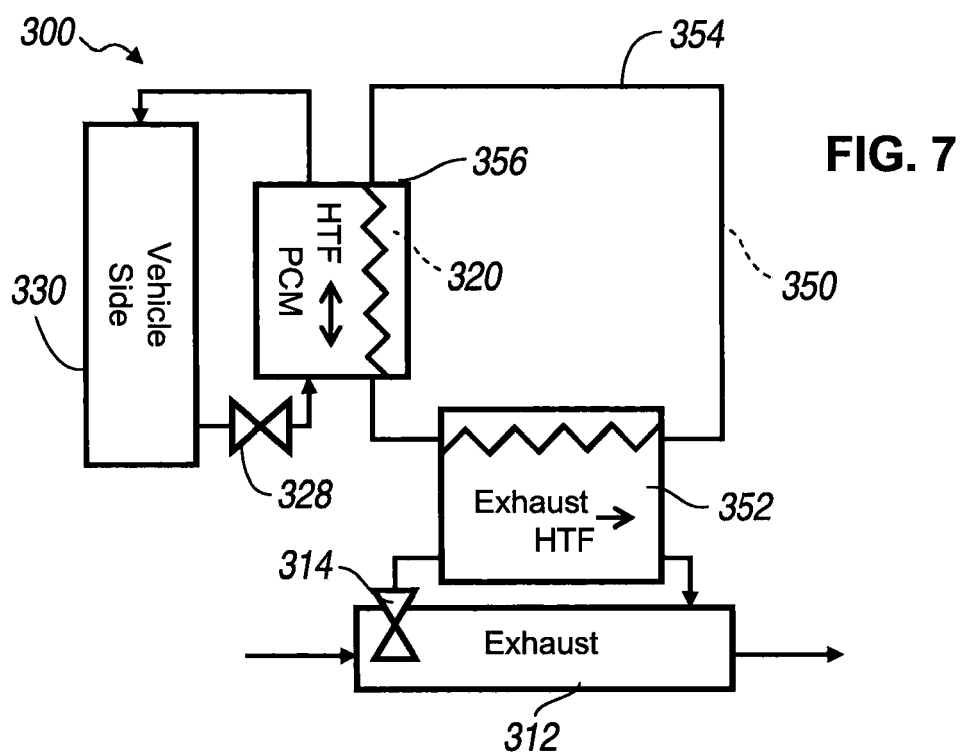
FIG. 7 is a schematic view of a fourth exemplary heat recovery system.

Referring now to FIG. 7, a fourth embodiment of an automotive heat recovery system is shown as reference number 300. The heat recovery system 300 has a similar control structure as the heat recovery system 10 when determining which mode to use for operation. As such, the heat recovery system 300 includes similar components as the heat recovery system 10, and like reference numbers are used to describe like components. In particular, the heat recovery system 300 includes a vehicle exhaust system 312, an exhaust bypass valve 314, a PCM 320, a coolant shut-off valve 328, and at least one vehicle subsystem 330.

In particular; the heat recovery system 300 uses a heat pipe cycle 350 and gravity for completing the heat transfer operation. Therefore, a pump is not required for driving the heat exchange between the exhaust gas and the PCM 320, resulting in less energy for operation and an improved fuel economy.

When the heat recovery system 300 is operating in the charge mode, the exhaust bypass valve 314 is opened to allow exhaust to enter a primary heat exchanger 352. The heat from the vehicle exhaust system 312 is used to evaporate a working fluid in a heat pipe 354 in the primary heat exchanger 352. Accordingly, the heat pipe 354 in the primary heat exchanger 352 acts as an evaporator. The evaporation of the working fluid reduces the density of the fluid (i.e., converts the working fluid to a gas), allowing the gas to flow upwardly in the direction of a secondary heat exchanger 356 containing the PCM 320.

After reaching the secondary heat exchanger 356, the vaporized fluid releases energy into the PCM 320 causing the vaporized fluid to condense. Accordingly, the heat pipe 354 in the secondary heat exchanger 356 acts as a condenser. The condensation of the working fluid increases the density of the fluid (i.e., converts the working fluid to a liquid) at the outlet of the heat pipe 354 in the secondary heat exchanger 356. As the density increases, gravitational forces cause the liquidized working fluid to move back towards the primary heat exchanger 352. All other system valving (e.g., coolant shut-off valve 328) for thermally coupling the secondary heat exchanger 356 to any other vehicle subsystem 330 would be closed during this mode. The heat recovery system 300 continues to charge the PCM 320 until it reaches a predetermined point wherein the heat recovery system 300 is adjudged to be fully charged. Once the charge temperature has been reached, the exhaust bypass valve 314 could then be shut.

Broadly, in charge mode, the exhaust bypass valve 314 is set to open and the coolant shut-off valve 328 is set to close. The flow of exhaust gases begins the cycle. Once the charge of the PCM 320 is complete, the exhaust bypass valve 314 is closed ceasing the flow of exhaust gases. In discharge mode, the exhaust bypass valve 314 and the coolant shut-off valve 328 are set to open. The cycle continues until the coolant temperature equals (or is greater than) a predetermined temperature target. The heat recovery system 300 is then switched back to charge mode.

In order to achieve effective charging of the PCM 320, a working fluid having a higher evaporation temperature than that of the PCM 320 should be chosen. An appropriate temperature gap must be selected to ensure good heat transfer between the working fluid and the PCM 320 and to ensure an adequate amount of sensible heat storage. For example, the temperature gap could be 15° C., 25° C., 50° C., or higher if the materials of construction can withstand the higher temperatures. Furthermore, the primary heat exchanger 352 and the secondary heat exchanger 356 must be relatively placed so as to result in a functioning gravity feed (i.e., the secondary heat exchanger 356 must be vertically higher than the primary heat exchanger 352). Alternately, however, an optional pump (not shown) may be included to pump the working fluid through the vapor compression cycle 350.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heat recovery system for capturing, storing, and releasing waste heat from exhaust of an engine of a vehicle, the system comprising: a first heat exchanger for receiving exhaust from a vehicle exhaust system; an evaporator thermally coupled to the first heat exchanger for transferring an energy of the vehicle exhaust to a heat transfer fluid and converting the heat transfer fluid to a gaseous state; an exhaust bypass valve between the vehicle exhaust system and the first heat exchanger configured to control flow of exhaust to the first heat exchanger; a condenser in fluid communication with the evaporator for receiving the gaseous heat transfer fluid and condensing the gaseous heat transfer fluid to a liquid state; a second heat exchanger thermally coupled to the condenser for transferring energy from the condensed heat transfer fluid to a storage device, wherein the heat transfer fluid is circulated by a heat pipe cycle and gravity due to the secondary heat exchanger being arranged vertically above the primary heat exchanger, and the heat recovery system is devoid of a pump, wherein the storage device continuously stores the energy during a charge mode until a predetermined temperature is obtained; a vehicle subsystem thermally coupled to the second heat exchanger; and a shutoff valve between the vehicle subsystem and the second heat exchanger configured to control flow of vehicle subsystem fluid to the second heat exchanger to be heated by the storage device; wherein: in a charging phase of the charge mode, which is activated when the engine has warmed to a predetermined operating temperature and phase change material of the second heat exchanger is below a predetermined capacity, the exhaust bypass valve is open to permit flow of exhaust to the first heat exchanger, and the shutoff valve is closed to restrict flow of vehicle subsystem fluid to the second heat exchanger; in a charge sustaining phase of the charge mode, which is activated after the storage device is at or above the predetermined temperature, the shutoff valve is opened to permit vehicle subsystem fluid to flow to the second heat exchanger and be heated by the storage device, and the exhaust bypass valve remains open until the storage device is fully heated; and in a discharge mode, which is activated during a cold start of the vehicle when the storage device is below the predetermined temperature, the exhaust bypass valve and the shutoff valve are open.

2. The heat recovery system of claim 1, wherein the vehicle subsystem is at least one of a seat heater, a cabin heater, a cup warmer, a transmission fluid, an engine oil, and an engine coolant.

3. The heat recovery system of claim 1, wherein the storage device is a phase change material that utilizes latent heat to accept heat from the heat transfer fluid.

4. The heat recovery system of claim 3, wherein the phase change material is one of a solid-to-solid, a solid-to-liquid, and a liquid-to-vapor phase change material.

5. The heat recovery system of claim 1, wherein the heat transfer fluid has an evaporation temperature and the phase change material has a phase change temperature, the evaporation temperature being greater than the phase change temperature.

6. The heat recovery system of claim 5, wherein the evaporation temperature is at least 5 degrees higher than the phase change temperature.

7. A heat recovery system for capturing, storing, and releasing waste heat from exhaust of an engine of a vehicle, the system comprising: a primary heat exchanger configured to receive exhaust from a vehicle exhaust system; an exhaust bypass valve between the vehicle exhaust system and the primary heat exchanger configured to control flow of exhaust to the primary heat exchanger; a secondary heat exchanger including a phase change material, the secondary heat exchanger is arranged vertically above the primary heat exchanger; a heat pipe connecting the primary and the secondary heat exchangers to transfer working fluid between the primary and secondary heat exchangers by a heat pipe cycle and gravity due to the secondary heat exchanger being arranged vertically above the primary heat exchanger, and without a pump; a vehicle subsystem thermally coupled to the secondary heat exchanger; and a shutoff valve between the vehicle subsystem and the secondary heat exchanger and configured to control flow of vehicle subsystem fluid to the secondary heat exchanger to be heated by the phase change material; wherein: at the primary heat exchanger heat from the exhaust evaporates the working fluid in the heat pipe to reduce the working fluid's density and convert the working fluid to a working gas that flows upwardly through the heat pipe to the secondary heat exchanger; at the secondary heat exchanger the working gas releases heat energy to heat the phase change material, the working gas condenses to the working fluid, and gravity causes the working fluid to flow back to the primary heat exchanger; in a charging phase of the charge mode, which is activated when the engine has warmed to a predetermined operating temperature and phase change material of the second heat exchanger is below a predetermined capacity, the exhaust bypass valve is open to permit flow of exhaust to the first heat exchanger, and the shutoff valve is closed to restrict flow of vehicle subsystem fluid to the second heat exchanger; in a charge sustaining phase of the charge mode, which is activated after the phase change material is at or above the predetermined temperature, the shutoff valve is opened to permit vehicle subsystem fluid to flow to the secondary heat exchanger and be heated by the phase change material, and the exhaust bypass valve remains open until the phase change material is fully heated; and a discharge mode is activated during a cold start of the vehicle when the phase change material is below the predetermined temperature, in the discharge mode the exhaust bypass valve and the shutoff valve are open.

\* \* \* \* \*